United States Patent Office 3,203,945
Patented Aug. 31, 1965

3,203,945
POLYMERIZATION OF CONJUGATED DIOLEFINS WITH A COBALTOUS COMPOUND-ALUMINUM ALKYL DIHALIDE-AMINE OR AMMONIA CATALYST
Robert P. Zelinski, Bartlesville, Okla., assignor to Phillips Petroleum Company, a corporation of Delaware
No Drawing. Filed Dec. 5, 1960, Ser. No. 73,505
9 Claims. (Cl. 260—94.3)

This invention relates to a process for polymerizing conjugated dienes. In one aspect, the invention relates to an improved process for polymerizing conjugated dienes and to a novel catalyst therefor. In another aspect, the invention relates to a process for polymerizing conjugated diolefins containing from 4 to 8 carbon atoms so as to form rubbery polymers. In still another aspect, the invention relates to a process for polymerizing 1,3-butadiene so as to obtain a rubbery polybutadiene containing a high percentage of cis 1,4-addition.

There has been a great deal of activity in recent years in the development of processes for the production of olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has also aroused considerable interest. The polymers formed by the use of these catalysts often have outstanding physical properties which render them equal to or even superior to natural rubber. In copending U.S. patent application, Serial No. 578,166, filed on April 16, 1956, by R. P. Zelinski and D. R. Smith, it is disclosed that a cis-polybutadiene can be prepared by polymerizing butadiene with a catalyst comprising an organoaluminum compound and titanium tetraiodide. The instant invention also provides a process whereby a polybutadiene containing a very high percentage of cis 1,4-addition can be prepared.

It is an object of this invention to provide a novel process for polymerizing conjugated dienes.

Another object of the invention is to provide a novel catalyst system for use in the polymerization of conjugated dienes containing from 4 to 8, inclusive, carbon atoms.

A further object of the invention is to provide a process for producing a rubbery polymer of 1,3-butadiene, which contains a very high percentage of cis 1,4-addition, e.g. in the range of 92 to 98 percent and higher.

Other and further objects and advantages of the invention will become apparent to those skilled in the art upon consideration of the accompanying disclosure.

Broadly speaking, the process of this invention comprises the step of contacting a monomeric material comprising a conjugated diene containing from 4 to 8, inclusive, carbon atoms per molecule with a catalyst comprising (1) a compound having the formula $RAlX_2$, wherein R is an alkyl radical, preferably containing from 1 to 20, inclusive, carbon atoms and X is a halogen, particularly chlorine, bromine, or iodine, and (2) the reaction product of a cobaltous or nickelous compound with a compound selected from the group consisting of ammonia and an amine. In a preferred embodiment of the invention, 1,3-butadiene is contacted with the aforementioned catalyst so as to produce a rubbery polymer containing a high percentage, e.g., 95 percent and higher, of cis 1,4-addition. In order to prepare rubbery, high cis-content polymers, the presence of an alkylaluminum dihalide in the catalyst system has been found to be essential. For example, when a catalyst consisting of a dialkylaluminum monohalide and the above-defined reaction product is employed, there is obtained a liquid polymer rather than a solid rubbery polymer containing a high percentage of cis 1,4-addition. However, it is to be understood that the invention is applicable to a catalyst containing a mixture of an alkylaluminum dihalide and a dialkylaluminum halide, often referred to as an alkylaluminum sesquihalide. Furthermore, while a polybutadiene having a high cis-content can be prepared with an alkylaluminum dihalide-cobaltous or nickelous compound catalyst system, the conversions obtained are generally low. Also, the product has a high inherent viscosity, which indicates that the material is difficult to process. By employing as a catalyst component the reaction product described herein, it was discovered that the conversions could be greatly increased. The use of the more active catalyst system of this invention also makes it possible to reduce the catalyst level while still obtaining the desired results. The catalyst system of this invention also provides a means for controlling the inherent viscosity or molecular weight of the product by regulating the amount of the amine-type compound used in preparing the reaction product.

Examples of compounds of the formula $RAlX_2$ which can be employed in the present catalyst system include methylaluminum dichloride, ethylaluminum dichloride, n-propylaluminum dichloride, isobutylaluminum dichloride, octylaluminum dichloride, dodecylaluminum dichloride, tridecylaluminum dichloride, eicosylaluminum dichloride, and the like. Corresponding compounds of the other halogens, particularly the bromides and the iodides, can likewise be employed in the catalyst system of this invention. As mentioned before, a mixture of any of the aforementioned compounds with its corresponding dialkylaluminum monohalide can be used in the catalyst system. However, the amount of the dihalide in the mixture must be greater than 50 percent in order to obtain a rubbery polymer.

The catalyst system of this invention in addition to the alkylaluminum dihalide includes a reaction product of a cobaltous or nickelous compound with a compound selected from the group consisting of ammonia and an amine. Cobaltous and nickelous compounds with which the amine-type compounds are reacted include the chloride, bromide, iodide, oxide, hydroxide, oxyhalide, carbonate, sulfate, phosphate, nitrate, sulfide, cyanide, thiocyanate, and cobaltous and nickelous salts of organic acids such as the acetate, the propionate, butyrate, palmitate, stearate, myristate, oxalate, and benzoate. The amine-type compounds with which the cobaltous and nickelous compounds are reacted include ammonia and primary, secondary and tertiary amines. Examples of these materials include methylamine, dimethylamine, trimethylamine, ethylamine, diethylamine, triethylamine, n-propylamine, diisopropylamine, tert.-butylamine, di-n-butylamine, tri-n-hexylamine, di(decyl)amine, dodecylamine, aniline, N-methylaniline, and heterocyclic amine-type compounds such as pyridine, quinoline, isoquinoline, morpholine, piperidine, and the alkyl derivatives thereof. Of the amine-type compounds, it is usually preferred to employ pyridine. In one modification of the invention, the cobaltous or nickelous compounds are contacted with the amine-type compounds in the stoichiometric amounts which are necessary to form a complex compound of the materials. As illustrated in Examples I to XIII hereinafter, this complex compound is then employed as a catalyst component along with the alkylaluminum dihalide. It is also within the scope of the invention to add additional amounts of the amine-type compounds to the catalyst which has been so prepared. The complex compound can be formed merely by bringing the materials into contact with one another, either in the presence of or in the absence of a diluent. It is not intended to limit the invention to any particular procedure since any method which will produce the complex compound is applicable. When a gaseous reactant, such as ammonia or methylamine, is employed, a closed system can be used with the gas being introduced into the vessel containing the cobaltous or nickelous compound. In another modification of the invention, the cobaltous or nickelous compounds and the amine-type compounds are charged directly to the polymerization reactor, either before or after introduction of the monomer and/or diluent. Alternatively, the amine-type compounds and the cobaltous or nickelous compounds can be contacted with one another in a separate vessel after which the resulting reaction product is charged to the reactor. However, these catalytic materials must be contacted with one another prior to the addition of any of the alkylaluminum dihalide. The amounts of the cobaltous or nickelous compounds and amine-type compounds employed according to this modification can be greater or less than the stoichiometric amounts required to form the complex compounds of the materials.

Examples of catalyst systems which can be used in the practice of the present invention include the following: ethylaluminum dichloride and the reaction product of cobaltous chloride and pyridine; methylaluminum dichloride, dimethylaluminum chloride and the reaction product of cobaltous sulfate and triethylamine; ethylaluminum diiodide and the reaction product of nickelous iodide and ammonia; isobutylaluminum dibromide and the reaction product of cobaltous bromide and quinoline; n-propylaluminum dichloride and the reaction product of cobaltous acetate and n-propylamine; n-butylaluminum dichloride and the reaction product of nickelous stearate and aniline; ethylaluminum dichloride and the reaction product of cobaltous chloride and ammonia; ethylaluminum dichloride, diethylaluminum chloride and the reaction product of cobaltous iodide and pyridine; ethylaluminum dichloride and the reaction product of cobaltous chloride and diethylamine; ethylaluminum dichloride and the reaction product of cobaltous acetate and pyridine; ethylaluminum dichloride and the reaction product of cobaltous bromide and pyridine; ethylaluminum dichloride and the reaction product of cobaltous carbonate and pyridine; ethylaluminum dichloride and the reaction product of cobaltous chloride and piperidine; ethylaluminum dichloride and the reaction product of cobaltous chloride and triethylamine; and ethylaluminum dichloride and the reaction product of cobaltous chloride and dimethylaniline.

The mol ratio of aluminum to cobalt or nickel in the present catalyst system is in the range of 2:1 to 400:1, preferably in the range of 2:1 to 25:1. The mol ratio of the amine-type compound to cobalt or nickel is in the range of 0.25:1 to 8.5:1, preferably in the range of 0.5:1 to 8:1. The amount of the catalyst used in the polymerization can vary within rather wide limits. The catalyst level can be conveniently expressed in terms of the cobalt or nickel, the amount generally being in the range of 0.0025 to 25 gram millimoles per 100 grams of the material to be polymerized.

The polymerization process of this invention can be carried out at temperatures varying over a rather wide range, e.g., from −100 to 250° F. or higher. The lower temperatures, e.g., from −30 to 120° F., are usually employed when it is desired to prepare polymers having a very high cis-content. The polymerization reactions can be carried out under autogenous pressure or at any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction.

The polymerization process of this invention is generally carried out in the presence of a diluent. Diluents suitable for use in the process are hydrocarbons which are substantially inert and non-detrimental to the polymerization reaction. Suitable diluents include aromatics, such as benzene, toluene, xylene, ethylbenzene, and mixtures thereof. It is also within the scope of the invention to use straight and branched chain paraffins which contain up to and including 12 carbon atoms per molecule. Examples of such paraffins which can be utilized include propane, normal butane, normal pentane, isopentane, normal hexane, isohexane, 2,2,4-trimethylpentane (isooctane), normal decane, and the like. Cycloparaffins, such as cyclohexane and methylcyclohexane, can also be used. Furthermore, mixtures of any of the aforementioned hydrocarbons can be used as diluents. It is usually preferred to carry out the polymerization in the presence of paraffins or cycloparaffins.

The monomeric material polymerized to produce rubbery polymers by the process of this invention comprises conjugated dienes containing from 4 to 8, inclusive, carbon atoms. Examples of conjugated dienes which can be used include 1,3-butadiene, 2-methyl-1,3-butadiene (isoprene), 2,3-dimethyl-1,3-butadiene, 2-methyl-1,3-pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene, and the like.

The invention is applicable to the polymerization of the above-defined conjugated dienes either alone or in admixture with each other and/or with one or more other unsaturated compounds, preferably containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene and 1-octene. Branched chain olefins, such as isobutylene, can be used as well as 1,1-dialkyl-substituted and 1,2-dialkyl-substituted ethylene such as 2-butene, 2-pentene, 2-hexene, 2-heptene, 2-methyl-1-butene, 2-methyl-1-hexene, 2-ethyl-1-heptene and the like. Other olefins which can be used include di- and polyolefins such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonitrile, methyl acrylate, methyl methacrylate, vinyl acetate and the like.

The process of this invention can be carried out as a batch process by charging the monomeric material into a reactor containing catalyst and diluent. When using a preformed complex compound as one of the catalyst components, any suitable charging procedure can be used. However, it is usually preferred to add the catalyst components to a reactor containing the diluent and thereafter introduce the monomer. In the modification in which the amine-type compound and the cobaltous or nickelous compound are charged directly to the reactor, these materials must be added so that they contact one another prior to introduction of the alkylaluminum dihalide. The process can also be carried out continuously by maintaining the above-mentioned concentrations of reactants in the reactor for a suitable residence time. In a continuous process, the amine-type compound and the cobaltous or nickelous compound are contacted with one another in a separate vessel. The resulting reaction product is then charged to the reactor as one stream and the alkylaluminum dihalide as another stream. Alternatively, these two streams can be mixed prior to their introduction into the reactor. The residence time in a continuous process will, of course, vary within rather wide limits, depending upon such variables as temperature, pressure, the ratio of catalyst components and the catalyst concentrations. In a continuous process, the residence time will usually fall within the range of 1 second to 1 hour when conditions within the specified ranges are employed. In a batch process, the time for the reaction can be as high as 24 hours or more.

Various materials are known to be detrimental to the catalyst composition of this invention. These materials include carbon dioxide, oxygen and water. It is usually desirable, therefore, that the monomer be freed of these materials as well as other materials which may tend to inactivate the catalyst. Any of the known means for removing such contaminants can be used. Furthermore, it is also preferred that the diluent employed in the process be freed of impurities such as water, oxygen and the like prior to its use in the process. In this connection, it is also desirable to remove air and moisture from the reaction vessel in which the polymerization is to be conducted. Although it is preferred to carry out the polymerization under anhydrous or substantially anhydrous conditions, it is to be understood that some small amounts of the catalyst-inactivating materials can be tolerated in the reaction mixture. However, it is to be understood that the amount of such materials which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to recover of the polymer. After addition of the catalyst-inactivating material and the antioxidant, the polymer present in the solution can then be separated by the addition of an excess of a material such as an ethyl alcohol or isopropyl alcohol. When the process is carried out continuously, the total effluent from the reactor can be pumped from the reactor to a catalyst-inactivating zone wherein the reactor effluent is contacted with a suitable catalyst-inactivating material, such as an alcohol. When an alcohol is used as a catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized, that it is within the scope of the invention to employ other suitable means to recover the polymer from solution. After separation from the water or alcohol and diluent by filtration or other suitable means, the polymer is then dried.

The process of this invention is particularly applicable to the production of rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the rubbery polymers of this invention. Liquid polymers can also be produced according to this invention by controlling the amounts of the catalyst ingredients. It has been found also that the presence of the amine-type compounds in some instances influences the type of product obtained from a given monomer. For example, in the case of isoprene, a brittle resin is obtained when the monomer is polymerized with an organoaluminum dichloride-cobaltous salt catalyst and in the absence of an amine-type compound. However, when an amine-type compound such as pyridine is present in the system, a rubbery product is found.

It is also within the scope of the invention to blend the polymers with other polymeric materials such as natural rubber, cis 1,4-polyisoprene, polyethylene, butadiene-styrene copolymers, and the like. As mentioned hereinbefore, the polybutadiene of this invention has a very high cis-content which renders the polymer very suitable for applications requiring low hysteresis, high resiliency and low freeze point. In general, the polymers of this invention have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis 1,4-addition, trans 1,4-addition and 1,2-addition of the butadiene. The procedure described hereinafter was employed in making these determinations.

The polymer samples were dissolved in carbon disulfide so as to form a solution having 25 grams of polymer per liter of solution. The infrared spectrum of each of the solutions (per cent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters$^{-1}$). The percent of the total unsaturation present as cis 1,4- was obtained by subtracting the trans 1,4- and 1,2- (vinyl) determined according to the above procedures from the theoretical unsaturation, assuming one double bond per each $C_4$ unit in the polymer.

EXAMPLE I

A series of runs was conducted in which 1,3-butadiene was polymerized with a catalyst consisting of a complex compound of cobaltous chloride and pyridine and ethylaluminum dichloride. Control runs were also carried out in which the catalyst consisted of the same complex compound and diethylaluminum chloride.

The complex compound of cobaltous chloride and pyridine, designated herein as dipyridinocobaltous chloride, was prepared in accordance with the method of Cox et al., J. Chem. Soc., 1937, 1956. Twenty-six grams (0.109 mol) of $CoCl_2 \cdot 6H_2O$ and 16 grams (0.203 mol) of pyridine were placed in a 500-milliliter three-necked flask. Noticeable heat was evolved when the materials were brought into contact and a blue solid was formed. This product was extracted with hot isopropyl alcohol, and the extract was filtered while hot. Upon cooling to room temperature, mauve crystals separated. The crystals were removed by filtration, washed three times with diethyl ether, and dried in a vacuum desiccator at room temperature. Analysis of the product for chlorine gave a value of 24.6 weight percent, the same as the calculated value.

The dipyridinocobaltous chloride prepared as above was employed in conjunction with diethylaluminum chloride or ethylaluminum dichloride in the polymerization of 1,3-butadiene. The recipe used in the runs was as follows:

Recipe

| | Parts by weight |
|---|---|
| 1,3-butadiene | 100 |
| Toluene | 1200 |
| Dipyridinocobaltous chloride (CoPy$_2$Cl$_2$) | Variable |
| Diethylaluminum chloride (DEAC) | Variable |
| Ethylaluminum dichloride (EADC) | Variable |
| Temperature, °F | 41 |
| Time, hours | 4 |

In each run, the toluene was charged to the reactor first followed by the dipyridinocobaltous chloride. The organoaluminum chloride was then added after which the butadiene was introduced. The polymerizations were effected in an atmosphere of nitrogen. In the runs of this example and of the succeeding examples, the polymers were recovered by coagulating same from solution by the addition of isopropyl alcohol and then drying in a vacuum oven. The materials charged and the results obtained are set forth hereinbelow in Table I.

aluminum chloride rather than ethylaluminum dichloride was utilized in the catalyst system, the products obtained were liquid polymers.

EXAMPLE II

Variable catalyst levels were employed in a series of runs for the polymerization of butadiene using a dipyridinocobaltous chloride-ethylaluminum dichloride initiator system. The recipe of Example I was used with a temperature of 41° F. and a polymerization time of 4 hours. The materials charged and the results obtained are shown below in Table III.

TABLE III

| Run No. | EADC, m.h.m. | CoPy$_2$Cl$_2$, m.h.m. | Al/Co mole ratio | Conversion, percent |
|---|---|---|---|---|
| 1 | 10 | 1 | 10/1 | 70 |
| 2 | 5 | 0.5 | 10/1 | 44 |
| 3 | 4 | 0.4 | 10/1 | 26 |
| 4 | 3 | 0.3 | 10/1 | 17 |

The data in Table III show that increasing the catalyst level increased the conversion when the Al/Co mole ratio was held constant.

TABLE I

| Run No. | CoPy$_2$Cl$_2$ p.h.m.[1] | CoPy$_2$Cl$_2$ m.h.m.[2] | DEAC m.h.m.[2] | EADC m.h.m.[2] | Al/Co mole ratio | Conv., percent | Remarks |
|---|---|---|---|---|---|---|---|
| 1 | 0.288 | 1.0 | 10 | | 10/1 | 20 | Liquid. |
| 2 | 0.288 | 1.0 | 5.0 | | 5/1 | 20 | Do. |
| 3 | 0.288 | 1.0 | 2.5 | | 2.5/1 | 20 | Do. |
| 4 | 1.44 | 5.0 | 10 | | 2/1 | 0 | |
| 5 | 1.44 | 5.0 | 5.0 | | 1/1 | 0 | |
| 6 | 0.288 | 1.0 | | 10 | 10/1 | 85 | Rubber. |
| 7 | 0.288 | 1.0 | | 5.0 | 5/1 | 35 | Do. |
| 8 | 0.288 | 1.0 | | 2.5 | 2.5/1 | 12 | Do. |
| 9 | 1.44 | 5.0 | | 10 | 2/1 | 70 | Do. |
| 10 | 1.44 | 5.0 | | 5.0 | 1/1 | 0 | |

[1] Parts by weight per 100 parts monomers.
[2] Millimoles per 100 grams monomers.

The inherent viscosity and microstructure of the rubbery products obtained in runs 6 through 9 were determined. The results of these determinations are shown below in Table II.

TABLE II

| Run No. | Microstructure, percent | | | Inherent viscosity[1] |
|---|---|---|---|---|
| | Cis | Trans | Vinyl | |
| 6 | 98.2 | 1.2 | 0.6 | 3.24 |
| 7 | 98.3 | 1.0 | 0.7 | 4.16 |
| 8 | 98.0 | 1.2 | 0.8 | 3.83 |
| 9 | 93.6 | 2.9 | 3.5 | 1.31 |

[1] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

The data in the foregoing tables show that rubbery polymers having a very high cis-content were produced with a catalyst consisting of dipyridinocobaltous chloride and ethylaluminum dichloride. However, when diethyl- The microstructure and inherent viscosity of the polymers obtained in Runs 1, 2 and 4 are shown below in Table IV.

TABLE IV

| Run No. | Microstructure, percent | | | Inherent viscosity[1] |
|---|---|---|---|---|
| | Cis | Trans | Vinyl | |
| 1 | 98 | 1.3 | 0.6 | 4.04 |
| 2 | 98.2 | 1.1 | 0.7 | 3.94 |
| 4 | 98.1 | 1.2 | 0.7 | 2.99 |

[1] See Footnote 1 of Table II.

EXAMPLE III

Toluene, cyclohexane, and n-heptane were used as solvents in a series of runs for the polymerization of butadiene in which a dipyridinocobaltous chloride-ethylaluminum dichloride catalyst system was employed. The quantities of diluent and monomer were the same as in Example I and the polymerization temperature was 41°

F. The materials charged and results obtained are shown below in Table V.

TABLE V

| Run No. | Diluent | EADC, m.h.m. | CoPy$_2$Cl$_2$, m.h.m. | Al/Co, mole ratio | Time, hours | Conv., percent |
|---|---|---|---|---|---|---|
| 1 | Toluene | 10 | 1.0 | 10/1 | 4 | 50 |
| 2 | Cyclohexane | 10 | 1.0 | 10/1 | 3 | 91 |
| 3 | Toluene | 10 | 2.0 | 5/1 | 4 | 98 |
| 4 | n-Heptane | 10 | 2.0 | 5/1 | 4 | 88 |

The microstructure and inherent viscosity of the polymers obtained in the foregoing runs are shown below in Table VI.

TABLE VI

| Run No. | Microstructure, percent | | | Inherent Viscosity [1] |
|---|---|---|---|---|
| | Cis | Trans | Vinyl | |
| 1 | 98.0 | 1.3 | 0.7 | 3.55 |
| 2 | 97.3 | 1.7 | 1.0 | 2.21 |
| 3 | 97.8 | 1.3 | 0.9 | 3.93 |
| 4 | 97.5 | 1.6 | 0.9 | 1.93 |

[1] See Footnote 1 of Table II.

The data in Tables V and VI show that when cyclohexane and n-heptane are substituted for toluene, a high conversion is obtained, the cis-content is high, and the molecular weight (indicated by inherent viscosity values) is much lower than when toluene is used as the diluent.

EXAMPLE IV

Two runs were carried out in which 1,3-butadiene was polymerized at 86° F., using toluene as the diluent and a catalyst consisting of dipyridinocobaltous chloride and ethylaluminum dichloride. The quantities of diluent and monomer were the same as in Example I. The materials charged and the results obtained are set forth below in Table VII.

TABLE VII

| Run No. | EADC, m.h.m. | CoPy$_2$Cl$_2$, m.h.m. | Al/Co mol ratio | Time, hours | Conversion, percent |
|---|---|---|---|---|---|
| 1 | 10 | 1 | 10/1 | 4 | 55 |
| 2 | 5 | 1 | 5/1 | 4 | 96 |

The microstructure and inherent viscosity of the polymers obtained in the foregoing runs are shown below in Table VIII.

TABLE VIII

| Run No. | Microstructure, percent | | | Inherent viscosity [1] |
|---|---|---|---|---|
| | Cis | Trans | Vinyl | |
| 1 | 96.9 | 2.0 | 1.1 | 2.19 |
| 2 | 95.3 | 3.0 | 1.7 | 2.37 |

[1] See Footnote 1 of Table II.

EXAMPLE V

A run was carried out in which 1,3-butadiene was polymerized in the presence of a catalyst consisting of dipyridinocobaltous chloride and ethylaluminum dichloride. The recipe used in this run was as follows:

Recipe 1,3-butadiene, parts by weight ____ 100.
Toluene, parts by weight _____ 1200.
Ethylaluminum dichloride (EADC),
 parts by weight _____ 5.08 (40 mmoles).
Dipyridinocobaltous chloride
 (CoPy$_2$Cl$_2$), parts by weight ____ 2.30 (8 mmoles).
EADC/CoPy$_2$Cl$_2$ mole ratio _____ 5/1.
Temperature, ° F. _____ 41.
Time, hours _____ 3.
Conversion, percent _____ 100.

The dipyridinocobaltous chloride was prepared as described above in Example I. The toluene was charged to the reactor first, after which the reactor was purged with nitrogen. The dipyridinocobaltous chloride was then charged, and the reactor was cooled to 41° F. Thereafter, the ethylaluminum dichloride was added as a 0.396 molar solution in toluene. After agitation of the reactor contents at 41° F. for 1.5 hours, the 1,3-butadiene was added.

Certain properties of the rubbery products obtained in this run are shown below in Table IX.

TABLE IX

Mooney, ML–4 at 212° F.[1] _____ 72
Inherent viscosity [2] _____ 2.35
Gel, percent [3] _____ 0
Microstructure, percent:
 Cis, by difference _____ 97.5
 Trans _____ 1.6
 Vinyl _____ 0.9

[1] ASTM D929–55T.
[2] See Footnote 1 of Table II.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

EXAMPLE VI

Two runs were carried out in which 1,3-butadiene was polymerized at 14° F., utilizing the catalyst system of this invention. The recipes used in these runs were as follows:

*Recipes*

| | | |
|---|---|---|
| 1,3-butadiene, parts by weight | 100 | 100 |
| Cyclohexane, parts by weight | 1,000 | |
| n-Heptane, parts by weight | | 1,000 |
| Ethylaluminum dichloride, parts by weight | [1]1.27 | [1]1.27 |
| Dipyridinocobaltous chloride, parts by weight | [2]0.576 | [2]0.576 |
| Temperature, °F | 14 | 14 |
| Time, hours | 3 | 3 |
| Conversion, percent | 95 | 84 |

[1] 10 mmoles.
[2] 2 mmoles.

The dipyridinocobaltous chloride was prepared as described in Example I. The procedure used was the same as described in Example V except that the mixture was cooled to 14° F. after addition of the complex cobalt compound and agitated for 15 minutes at 14° F. after addition of the ethylaluminum dichloride.

The Mooney viscosity, inherent viscosity and microstructure of the rubbery products obtained in these runs are shown below in Table X.

TABLE X

| | | |
|---|---|---|
| Inherent viscosity [1] | 3.13 | 2.94 |
| Mooney, ML-4 at 212° F.[2] | 133 | 121 |
| Microstructure, percent: | | |
| Cis, by difference | 98.2 | 98.3 |
| Trans | 0.7 | 0.6 |
| Vinyl | 1.1 | 1.1 |

[1] See Footnote 1 of Table II.
[2] ASTM D929-55T.

EXAMPLE VII

A run was conducted in which 1,3-butadiene was polymerized with the catalyst of this invention in which the mol ratio of ethylaluminum dichloride to dipyridinocobaltous chloride was 100 to 1. The recipe used in this run was as follows:

*Recipe*

1,3-butadiene, parts by weight _____ 100
Toluene, parts by weight _____ 6900
Ethylaluminum dichloride, millimoles _____ 10
Dipyridinocobaltous chloride, millimoles _____ 0.10
Temperature, °F. _____ 41
Time, hours _____ 15
Conversion, percent _____ 23

The complex cobalt compound was prepared as described in Example I. The toluene was charged initially to the reactor which was then purged with nitrogen. The dipyridinocobaltous chloride was then added to the reactor after which the butadiene and ethylaluminum dichloride were charged in that order.

Certain properties of the rubbery product obtained in this run are shown below in Table XI.

TABLE XI

Inherent viscosity [1] _____ 1.52
Gel, percent [2] _____ 0
Microstructure, percent:
   Cis, by difference _____ 97.1
   Trans _____ 1.7
   Vinyl _____ 1.2

[1] See footnote 1 of Table II.
[2] See footnote 3 of Table IX.

EXAMPLE VIII

A series of runs were carried out in which 1,3-butadiene was polymerized with a catalyst consisting of dipyridinocobaltous chloride and ethylaluminum sesquichloride. The following recipe was used in this run:

*Recipe*

Parts by weight 1,3-butadiene _____ 100
Toluene _____ 1200
Ethylaluminum sesquichloride (EASC) _____ Variable
Dipyridinocobaltous chloride (CoPy$_2$Cl$_2$), mmole _____ Variable
Temperature, °F. _____ 41
Time, hours _____ 16

The complex cobalt compound was prepared as described in Example I. The diluent was charged first to the reactor which was then purged with nitrogen. The dipyridinocobaltous chloride was then added to the reactor after which the ethylaluminum sesquichloride and the butadiene were charged in that order.

The results obtained in these are summarized below in Table XII.

TABLE XII

IN TOLUENE

| Run No. | EASC | | CoPy$_2$Cl$_2$ | | Mole ratio Al/Co | Conv., percent | Inh. Visc. [1] | Gel, percent [2] | Microstructure, percent | | |
|---|---|---|---|---|---|---|---|---|---|---|---|
| | Parts | Mmoles | Parts | Mmoles | | | | | Cis | Trans | Vinyl |
| 1 | 2.48 | 10 | 0.30 | 1.0 | 20/1 | 99 | 2.15 | 0 | 94.9 | 3.3 | 1.8 |
| 2 | 1.85 | 7.5 | 0.29 | 1.0 | 15/1 | 98 | 2.30 | 0 | 95.0 | 3.3 | 1.7 |
| 3 | 1.24 | 5.0 | 0.29 | 1.0 | 10/1 | 92 | 2.07 | 0 | 94.5 | 3.7 | 1.8 |
| 4 | 0.62 | 2.5 | 0.29 | 1.0 | 5/1 | 93 | 1.40 | 0 | 93.9 | 3.5 | 2.6 |
| 5 | 0.37 | 1.5 | 0.29 | 1.0 | 3/1 | 84 | 2.74 | 0 | 96.9 | 1.7 | 1.4 |
| 6 | 0.31 | 1.25 | 0.29 | 1.0 | 2.5/1 | 60 | 2.31 | 0 | 96.2 | 2.1 | 1.7 |
| 7 | 0.25 | 1.0 | 0.29 | 1.0 | 2/1 | 14 | 2.86 | 0 | 96.9 | 1.5 | 1.6 |
| 8 | 2.48 | 10 | 0.30 | 1.02 | 20/1 | 99 | 2.15 | 0 | 94.9 | 3.3 | 1.8 |
| 9 | 2.48 | 10 | 0.38 | 1.33 | 15/1 | 96 | 2.95 | 0 | 94.7 | 3.5 | 1.8 |
| 10 | 2.48 | 10 | 0.58 | 2.0 | 10/1 | 94 | 1.70 | 0 | 92.6 | 4.8 | 2.6 |
| 11 | 2.48 | 10 | 1.15 | 4.0 | 5/1 | 89 | 1.50 | 0 | 88.5 | 7.9 | 3.6 |
| 12 | 2.48 | 10 | 1.97 | 6.8 | 3/1 | 61 | 0.66 | 0 | | | |

IN CYCLOHEXANE

| Run No. | Parts | Mmoles | Parts | Mmoles | Mole ratio Al/Co | Conv., percent | Inh. Visc. [1] | Gel, percent [2] | Cis | Trans | Vinyl |
|---|---|---|---|---|---|---|---|---|---|---|---|
| 13 | 1.24 | 5 | 0.29 | 1.0 | 10/1 | 78 | 0.18 | 6 | | | |

IN HEPTANE

| Run No. | Parts | Mmoles | Parts | Mmoles | Mole ratio Al/Co | Conv., percent | Inh. Visc. [1] | Gel, percent [2] | Cis | Trans | Vinyl |
|---|---|---|---|---|---|---|---|---|---|---|---|
| 14 | 1.24 | 5 | 0.30 | 1.0 | 10/1 | 41 | 0.34 | 3 | | | |

[1] See Footnote 1 of Table II.
[2] See Footnote 3 of Table IX.

EXAMPLE IX

A series of runs were carried out in which 1,3-butadiene was polymerized with catalysts consisting of dipyridinocobaltous chloride and different mixtures of ethylaluminum dichloride and diethylaluminum chloride. The following recipe was used in the runs:

Recipe

| | Parts by weight |
|---|---|
| 1,3-butadiene | 100. |
| Toluene | 1200. |
| Diethylaluminum chloride (DEAC) | Variable. |
| Ethylaluminum dichloride (EADC) | Variable. |
| $CoPy_2Cl_2$ | 0.29 (1 mmole). |
| Temperature, °F. | 41. |
| Time, hours | 16. |

The dipyridinocobaltous chloride was prepared as described in Example I. The toluene was charged initially to the reactor which was then purged with nitrogen. Thereafter, the ethylaluminum dichloride, the diethylaluminum chloride, the complex cobalt compound and the butadiene were charged in that order.

The results obtained in the runs are summarized below in Table XIII.

TABLE XIII

| Run No. | EADC, Mmoles | DEAC, Mmoles | Conv., percent | Inherent viscosity[1] | Microstructure, percent | | | Type of product |
|---|---|---|---|---|---|---|---|---|
| | | | | | Cis | Trans | Vinyl | |
| 1 | 5 | 0 | 94 | 2.19 | 96.6 | 1.9 | 1.5 | Rubber. |
| 2 | 4 | 1 | 95 | 1.71 | 95.3 | 2.7 | 2.0 | Do. |
| 3 | 3 | 2 | 77 | 0.98 | 90.3 | 5.2 | 4.5 | Sticky. |
| 4 | 2.5 | 2.5 | 70 | 0.62 | 86.3 | 6.6 | 7.1 | Very viscous liquid. |

[1] See Footnote 1 of Table II.

The data in Table XIII show that mixtures of ethylaluminum dichloride diethylaluminum chloride can be used with dipyridinocobaltous chloride to polymerize butadiene to a rubbery polymer. However, the amount of ethyl-aluminum dichloride in the mixture must be above 50 percent on a mol basis.

EXAMPLE X

A run was conducted in which 1,3-butadiene was polymerized with the catalyst of this invention in which the mol ratio of ethylaluminum sesquichloride to dipyridinocobaltous chloride was 400 to 1. The recipe used in this run was as follows:

Recipe

| | Parts by weight |
|---|---|
| 1,3-butadiene | 100. |
| Toluene | 1200. |
| Ethylaluminum sesquichloride | 0.5 (2 mmoles). |
| Diphyridinocobaltous chloride | 0.0014 (0.005 mmole). |
| Temperature, °F. | 41. |
| Time, hours | 17. |
| Conversion, percent | 51. |

The dipyridinocobaltous chloride used in the run was prepared as described in Example I. The toluene was charged first to the reactor which was then purged with nitrogen. The butadiene was then added, and the reactor was cooled to 41° F. Thereafter, the ethylaluminum sesquichloride and the complex cobalt compound were charged in that order.

The inherent viscosity and the microstructure of the rubber product obtained is shown below in Table XIV.

TABLE XIV

| | |
|---|---|
| Inherent viscosity[1] | 5.15 |
| Microstructure, percent: | |
| Cis, by difference | 98.7 |
| Trans | 0.7 |
| Vinyl | 0.6 |

[1] See Footnote 1 of Table II.

EXAMPLE XI

A series of runs was carried out to demonstrate the effect of diluent level in the polymerization of 1,3-butadiene with an ethylaluminum dichloride-dipyridinocobaltous chloride catalyst. The recipe used in the runs was as follows:

Recipe

| | Parts by weight |
|---|---|
| 1,3-butadiene | 100. |
| Toluene | Variable. |
| Ethylaluminum dichloride (EADC) | 1.27. |
| Dipyridinocobaltous chloride ($CoPy_2Cl_2$) | 0.58 (2.0 mmoles). |
| Temperature, °F. | 41. |
| Time, hours | 16.5. |

The dipyridinocobaltous chloride was prepared as described in Example I. The toluene was charged initially to the reactor which was then purged with nitrogen. Thereafter, the complex cobalt compound, the butadiene and the ethylaluminum dichloride were added in that order.

The results obtained in these runs are shown below in Table XV.

TABLE XV

| Run No. | Toluene, parts | Conversion, percent | Inherent viscosity[1] | Gel, percent[2] | Microstructure, percent | | |
|---|---|---|---|---|---|---|---|
| | | | | | Cis | Trans | Vinyl |
| 1 | 6,470 | 73 | 0.57 | 0 | 93.7 | 4.3 | 2.0 |
| 2 | 4,850 | 85 | 0.77 | 0 | 94.1 | 4.0 | 1.9 |
| 3 | 2,425 | 90 | 1.62 | 0 | 96.0 | 2.6 | 1.4 |
| 4 | 1,212 | 100 | 3.19 | 0 | 96.9 | 2.1 | 1.0 |

[1] See Footnote 1 of Table II.
[2] See Footnote 3 of Table IX.

EXAMPLE XII

A series of runs were carried out to demonstrate the effect of catalyst level and ratio of catalyst components in the polymerization of 1,3-butadiene. The following recipe was used in these runs:

*Recipe*

| | Parts by weight |
|---|---|
| 1,3-butadiene | 100. |
| Toluene | 6900. |
| Ethylaluminum dichloride (EADC) | Variable. |
| Dipyridinocobaltous chloride (CoPy$_2$Cl$_2$) | Variable |
| Temperature, °F. | 41. |
| Time, hours | 15. |

The dipyridinocobaltous chloride used was prepared as described in Example I. The toluene was charged first to the reactor which was then purged with nitrogen. Thereafter, the complex cobalt compound, the butadiene and the ethylaluminum dichloride were added in that order.

The results obtained in these runs are summarized below in Table XVI.

TABLE XVI

| Run No. | EADC, mmoles | CoPy$_2$Cl$_2$, mmoles | EADC/Co, mole ratio | Conv., percent | Inh. Visc.[1] | Gel, percent[2] | Microstructure, percent | | |
|---|---|---|---|---|---|---|---|---|---|
| | | | | | | | Cis | Trans | Vinyl |
| 1 | 10.0 | 0.50 | 20/1 | 63 | 0.95 | 0 | | | |
| 2 | 10.0 | 0.20 | 50/1 | 50 | 1.14 | 0 | 96.5 | 2.1 | 1.4 |
| 3 | 5.0 | 1.00 | 5/1 | 51 | 0.40 | 0 | | | |
| 4 | 10.0 | 0.10 | 100/1 | 23 | 1.52 | 0 | 97.1 | 1.7 | 1.2 |

[1] See Footnote 1 of Table II.
[2] See Footnote 3 of Table IX.

EXAMPLE XIII

A series of runs was carried out to demonstrate the effect of the presence of small amounts of added pyridine in a dipyridinocobaltous chloride-ethylaluminum dichloride catalyst system. The recipe employed in these runs was as follows:

*Recipe*

| | |
|---|---|
| 1,3-butadiene, parts by weight | 100. |
| Toluene, parts by weight | 1200. |
| Ethylaluminum dichloride, millimoles | 10. |
| Dipyridinocobaltous chloride, millimoles | 1.0. |
| Pyridine, millimoles | Variable. |
| Temperature, °F. | 41. |
| Time, hours | 4. |

The dipyridinocobaltous chloride used in these runs was prepared as described in Example I. The toluene was charged first to the reactor which was then purged with nitrogen. The complex cobalt compound was then added, after which the pyridine was introduced as a 0.27 molar solution in toluene. Thereafter, the ethylaluminum dichloride was added as a 0.33 molar solution in toluene followed by the butadiene.

The results obtained in these runs are summarized below in Table XVII.

From the data shown in the following table, it is seen that the presence of small amounts of pyridine can be tolerated in the catalyst system.

TABLE XVII

| Run No. | Pyridine, mmoles | Conversion, percent | Inherent viscosity[1] | Gel, percent[2] | Microstructure, percent | | |
|---|---|---|---|---|---|---|---|
| | | | | | Cis | Trans | Vinyl |
| 1 | 1.0 | 72 | 3.99 | 0 | 98.1 | 1.1 | 0.8 |
| 2 | 2.0 | 82 | 3.82 | 0 | 97.8 | 1.2 | 1.0 |
| 3 | 3.0 | 47 | 2.65 | 0 | 97.1 | 1.2 | 1.7 |
| 4 | 4.0 | 23 | 1.76 | 0 | 95.5 | 1.7 | 2.8 |

[1] See Footnote 1 of Table II.
[2] See Footnote 3 of Table IX.

EXAMPLE XIV

Butadiene was polymerized in a series of runs in the presence of a cobaltous chloride-ethylaluminum dichloride-pyridine catalyst system. A control run was made in which pyridine was omitted from the system. The following polymerization recipe was used:

*Recipe*

| Parts by weight | |
|---|---|
| 1,3-butadiene | 100. |
| Toluene | 1200. |
| Pyridine (Py) | Variable. |
| Ethylaluminum dichloride (EADC) | 1.27 (10 mmoles). |
| Cobaltous chloride (CoCl$_2$) | 0.13 (1.0 mmole). |
| Temperature, °F. | 41. |
| Time, hours | 16. |

The procedure followed in the runs was to charge the toluene first to the reactor which was then purged with nitrogen. The cobaltous chloride was then added, followed by the pyridine and the ethylaluminum dichloride. The butadiene was charged last to the reactor. The results obtained are shown below in Table XVIII.

TABLE XVIII

| Run No. | Pyridine, mmoles | Py/Co, mole ratio | Conv., percent | Inherent viscosity[1] | Gel, percent[2] | Microstructure, percent | | |
|---|---|---|---|---|---|---|---|---|
| | | | | | | Cis | Trans | Vinyl |
| 1 | 0 | | 10 | 4.85 | 0 | | | |
| 2 | 1 | 1/1 | 23 | 7.18 | 0 | 98.6 | 0.9 | 0.5 |
| 3 | 2 | 2/1 | 69 | 5.40 | 0 | | | |
| 4 | 3 | 3/1 | 86 | 4.13 | 0 | | | |
| 5 | 4 | 4/1 | 94 | 3.24 | 0 | 96.4 | 2.0 | 1.6 |
| 6 | 5 | 5/1 | 94 | 2.67 | 0 | | | |
| 7 | 6 | 6/1 | 97 | 1.97 | 0 | | | |
| 8 | 7 | 7/1 | 92 | 1.84 | 0 | | | |
| 9 | 8 | 8/1 | 91 | 1.37 | 0 | 95.1 | 2.5 | 2.4 |
| 10 | 9 | 9/1 | 0 | | 0 | | | |
| 11 | 10 | 10/1 | 0 | | 0 | | | |

[1] See Footnote 1 of Table II.
[2] See Footnote 3 of Table IX.

These data show that even a small amount of pyridine has an appreciable effect on conversion and that the molecular weight of the polymer (indicated by inherent viscosity values) can be regulated by controlling the amount of pyridine. A further study of the data shows that the highest conversions are obtained when the pyridine/cobalt mole ratio is 2/1 or greater.

EXAMPLE XV

A series of runs was made using ethylaluminum dichloride, either cobaltous chloride or cobaltous acetate, and pyridine as the catalyst system for the polymerization of butadiene. Control runs were made in which pyridine was omitted from the catalyst system. The recipe was as follows:

| Recipe | Parts by weight |
|---|---|
| 1,3-butadiene | 100. |
| Toluene | 1200. |
| Ethylaluminum dichloride (EADC) | Variable. |
| Cobaltous chloride (CoCl) | 0 or 0.13 (0 or 1 mmole). |
| Cobaltous acetate [Co(C$_2$H$_3$O$_2$)$_2$] | 0 or 0.18 (0 or 1 mmole). |
| Pyridine (Py) | Variable. |
| Temperature, °F. | 41. |
| Time, hours | 16. |

These data show that the EADC-CoCl$_2$ catalyst system is rendered much more efficient by the addition of pyridine. The data also show that the ethylaluminum dichloride level can be varied and polymers having a high cis-content at high conversions can be obtained. At the lowest ethylaluminum dichloride level, no polymer was obtained at a pyridine to cobalt mole ratio of 2/1. However, at a higher ethylaluminum dichloride level, high conversions were obtained with this mole ratio of ingredients. As shown by the foregoing data and the data of the examples which follow, the mole ratio of amine-type compound to alkylaluminum dihalide should not exceed 0.6 when the level of the alkylaluminum dihalide is below 10 millimoles per 100 parts of monomer.

EXAMPLE XVI

The recipe and procedure of Example XIV were followed using 0.13 part (1 mmole) of cobaltous chloride and a polymerization temperature of 86° F. instead of 41° F. Reaction time was 16 hours. Materials charged and results obtained are shown in the following table.

As seen from the data in Table XX, Runs 1, 5, and 11 conducted without pyridine gave much lower conversions than the runs carried out according to the invention. Also, the product from Runs 1 and 5 had a high gel content while all polymers prepared with systems containing pyridine were gel free. Even though the temperature

TABLE XX

| Run No. | EADC, mmoles | Pyridine, mmoles | Conv., percent | Inherent viscosity [1] | Gel, percent [2] | Microstructure, percent | | |
|---|---|---|---|---|---|---|---|---|
| | | | | | | Cis | Trans | Vinyl |
| 1 | 10 | | 50 | | 88 | | | |
| 2 | 10 | 2 | 93 | 3.88 | 0 | | | |
| 3 | 10 | 5 | 95 | 1.43 | 0 | 92.5 | 4.3 | 3.2 |
| 4 | 10 | 10 | 0 | | | | | |
| 5 | 5 | | 32 | | 73 | | | |
| 6 | 5 | 1 | 93 | 3.44 | 0 | | | |
| 7 | 5 | 2 | 96 | 1.67 | 0 | | | |
| 8 | 5 | 2.5 | 95 | 1.39 | 0 | 92.0 | 4.1 | 3.9 |
| 9 | 5 | 3 | 90 | 1.06 | 0 | | | |
| 10 | 5 | 5 | 0 | | | | | |
| 11 | 2.5 | | 13 | 3.59 | 0 | 95.5 | 3.5 | 1.0 |
| 12 | 2.5 | 1.25 | 87 | 1.39 | 0 | 93.7 | 3.3 | 3.0 |
| 13 | 2.5 | 2.0 | 0 | | | | | |

[1] See Footnote 1 of Table II.
[2] See Footnote 3 of Table IX.

These runs were conducted according to the procedure as described in Example XIV. The results obtained in these runs are shown below in Table XIX.

was much higher than in Example XIV, the cis contents remained at a high level.

When diethylaluminum chloride was employed in place

TABLE XIX
1.0 MMOLE COBALTOUS ACETATE

| Run No. | EADC, mmoles | Pyridine, mmoles | Conv., percent | Inherent viscosity [1] | Gel, percent [2] | Microstructure, percent | | |
|---|---|---|---|---|---|---|---|---|
| | | | | | | Cis | Trans | Vinyl |
| 1 | 10 | 0 | 21 | 2.21 | 0 | 97.1 | 1.7 | 1.2 |
| 2 | 10 | 2 | 94 | 3.59 | 0 | 97.3 | 1.7 | 1.0 |
| 3 | 10 | 5 | 97 | 2.50 | 0 | 96.6 | 2.0 | 1.4 |
| 4 | 10 | 10 | 0 | | | | | |
| 5 | 5 | 0 | 19 | 2.56 | 0 | 97.2 | 1.7 | 1.1 |
| 6 | 5 | 1 | 90 | 2.95 | 0 | 97.1 | 1.7 | 1.2 |
| 7 | 5 | 2 | 90 | 2.51 | 0 | 96.4 | 2.0 | 1.6 |
| 8 | 5 | 2.5 | 82 | 2.38 | 0 | 96.3 | 2.0 | 1.7 |
| 9 | 5 | 3 | 46 | 1.60 | 0 | 95.9 | 1.8 | 2.3 |

1.0 MMOLE COBALTOUS CHLORIDE

| Run No. | EADC, mmoles | Pyridine, mmoles | Conv., percent | Inherent viscosity [1] | Gel, percent [2] | Microstructure, percent | | |
|---|---|---|---|---|---|---|---|---|
| | | | | | | Cis | Trans | Vinyl |
| 10 | 10 | 0 | 20 | 5.64 | 24 | | | |
| 11 | 10 | 2 | 76 | 5.18 | 0 | 98.3 | 1.0 | 0.7 |
| 12 | 10 | 5 | 95 | 2.59 | 0 | 96.6 | 1.9 | 1.5 |
| 13 | 10 | 10 | 0 | | | | | |
| 14 | 5 | 0 | 10 | 5.86 | 0 | | | |
| 15 | 5 | 1 | 52 | | | | | |
| 16 | 5 | 2 | 90 | 2.59 | 0 | 97.5 | 1.0 | 1.5 |
| 17 | 5 | 2.5 | 91 | 2.16 | 0 | 96.3 | 1.9 | 1.8 |
| 18 | 5 | 3 | 7 | | 0 | | | |
| 19 | 2.5 | 0 | 2 | 4.86 | 0 | | | |
| 20 | 2.5 | 1.25 | 76 | 1.77 | 0 | 96.0 | 1.8 | 2.2 |
| 21 | 2.5 | 2.0 | 0 | | | | | |

[1] See Footnote 1 of Table II.
[2] See Footnote 3 of Table IX.

of ethylaluminum dichloride with cobaltous chloride and pyridine in recipes analogous to those of Examples XIV and XV, no polymerization was obtained at 41° F., 86° F., or 122° F.

EXAMPLE XVII

A series of runs was conducted at −18° F., using variable amounts of pyridine, ethylaluminum dichloride, and cobaltous chloride. Butadiene and toluene were used in the quantities given in Example XIV, and the same charge order was followed. Polymerization time was 16 hours. Materials charged and results obtained are shown below in Table XXI.

EXAMPLE XVIII

One millimole of either cobaltous bromide, cobaltous iodide, or cobaltous carbonate was used with variable amounts of ethylaluminum dichloride and pyridine in a series of runs for the polymerization of butadiene at 41° F. The recipe and procedure of Example XIV were followed in these runs. The quantities of materials charged and results obtained are summarized in Table XXII.

TABLE XXII

| Run No. | EADC, mmoles | Cobalt compound | | Pyridine, mmoles | Conv., percent | Inh. visc.[1] | Gel, percent [2] | Microstructure, percent | | |
|---|---|---|---|---|---|---|---|---|---|---|
| | | Type | mmoles | | | | | Cis | Trans | Vinyl |
| 1 | 10 | CoBr$_2$ | 1 | --- | 0 | --- | --- | --- | --- | --- |
| 2 | 10 | CoBr$_2$ | 1 | 2 | 95 | 3.90 | 0 | 97.7 | 1.3 | 1.0 |
| 3 | 10 | CoBr$_2$ | 1 | 5 | 93 | 1.89 | 0 | 95.9 | 2.1 | 2.0 |
| 4 | 5 | CoBr$_2$ | 1 | --- | 0 | --- | --- | --- | --- | --- |
| 5 | 5 | CoBr$_2$ | 1 | 1 | 93 | 3.5 | 0 | 97.3 | 1.5 | 1.2 |
| 6 | 5 | CoBr$_2$ | 1 | 2.5 | 55 | 2.6 | 0 | 96.6 | 1.6 | 1.8 |
| 7 | 10 | CoI$_2$ | 1 | --- | 17 | 6.7 | 0 | --- | --- | --- |
| 8 | 10 | CoI$_2$ | 1 | 2 | 30 | 4.0 | 0 | --- | --- | --- |
| 9 | 10 | CoI$_2$ | 1 | 5 | 38 | 2.1 | 0 | 96.4 | 1.5 | 2.1 |
| 10 | 5 | CoI$_2$ | 1 | --- | 9 | 5.5 | 0 | --- | --- | --- |
| 11 | 5 | CoI$_2$ | 1 | 2 | 18 | --- | 0 | --- | --- | --- |
| 12 | 5 | CoI$_2$ | 1 | 2.5 | 19 | 1.7 | 0 | 95.5 | 1.8 | 2.7 |
| 13 | 5 | CoI$_2$ | 1 | 3 | 23 | 1.6 | 0 | --- | --- | --- |
| 14 | 10 | CoCO$_3$ | 1 | --- | 3 | 4.51 | 0 | --- | --- | --- |
| 15 | 10 | CoCO$_3$ | 1 | 2 | 17 | --- | --- | --- | --- | --- |
| 16 | 10 | CoCO$_3$ | 1 | 5 | 18 | 3.30 | 0 | 97.2 | 1.3 | 1.5 |
| 17 | 5 | CoCO$_3$ | 1 | --- | 3 | 4.76 | 0 | --- | --- | --- |
| 18 | 5 | CoCO$_3$ | 1 | 2 | 30 | --- | --- | --- | --- | --- |
| 19 | 5 | CoCO$_3$ | 1 | 2.5 | 30 | 2.95 | 0 | 96.9 | 1.5 | 1.6 |

[1] See Footnote 1 of Table II.
[2] See Footnote 3 of Table IX.

EXAMPLE XIX

Variable amounts of piperidine, triethylamine, or dimethylaniline were employed in an ethylaluminum dichloride-CoCl$_2$ catalyst system for polymerization of butadiene at 41° F. The amounts of butadiene and toluene

TABLE XXI

| Run No. | EADC, mmoles | CoCl$_2$, mmoles | Pyridine, mmoles | Conv., percent | Inherent viscosity [1] | Gel, percent [2] | Microstructure, percent | | |
|---|---|---|---|---|---|---|---|---|---|
| | | | | | | | Cis | Trans | Vinyl |
| 1 | 10 | 1 | 0 | 3 | 4.55 | 0 | --- | --- | --- |
| 2 | 10 | 1 | 5 | 61 | 3.89 | 0 | 98.5 | 0.8 | 0.7 |
| 3 | 10 | 1 | 8 | 66 | 2.90 | 0 | 96.8 | 1.7 | 1.5 |
| 4 | 5 | 1 | 0 | 1 | 5.38 | 0 | --- | --- | --- |
| 5 | 5 | 1 | 3 | 22 | 2.91 | 0 | 96.9 | 1.4 | 1.7 |
| 6 | 15 | 1.5 | 9 | 94 | 4.82 | 0 | --- | --- | --- |
| 7 | 20 | 2.0 | 12 | 94 | 5.68 | 0 | --- | --- | --- |

[1] See Footnote 1 of Table II.
[2] See Footnote 3 of Table IX.

These data show that polymerizations can be carried out at a low temperature while obtaining at high conversions gel-free, high cis-content polymers. Very low conversions resulted when using systems which did not include pyridine.

were the same as in Example XIV and the CoCl$_2$ level was 1 millimole. The charge order was also the same as in Example XIV, and the polymerization time was 16 hours. The materials charged and the results obtained are given below in Table XXIII.

TABLE XXIII

| Run No. | EADC, mmoles | Amine-type compound | | Conv., percent | Inh. visc.[1] | Gel, percent [2] | Microstructure, percent | | |
|---|---|---|---|---|---|---|---|---|---|
| | | Compound used | mmoles | | | | Cis | Trans | Vinyl |
| 1 | 10 | --- | --- | 21 | 7.2 | 39 | --- | --- | --- |
| 2 | 10 | Piperidine | 2 | 61 | 5.6 | Trace | 98.2 | 1.0 | 0.8 |
| 3 | 10 | do | 5 | 78 | 4.6 | Trace | 97.1 | 1.4 | 1.5 |
| 4 | 5 | --- | --- | 15 | 1.3 | 0 | --- | --- | --- |
| 5 | 5 | Piperidine | 1 | 41 | 5.5 | 0 | 97.6 | 1.2 | 1.2 |
| 6 | 5 | do | 2.5 | 52 | 2.4 | 0 | 96.7 | 1.4 | 1.9 |
| 7 | 2.5 | --- | --- | 3 | --- | --- | --- | --- | --- |
| 8 | 2.5 | Piperidine | 1.25 | 17 | 1.9 | 0 | 95.6 | 1.7 | 2.7 |
| 9 | 10 | --- | --- | 12 | 5.7 | 3 | --- | --- | --- |
| 10 | 10 | Triethylamine | 2 | 63 | 5.1 | 0 | 98.0 | 1.0 | 1.0 |
| 11 | 10 | do | 5 | 68 | 2.1 | 0 | 96.4 | 1.5 | 2.1 |
| 12 | 5 | --- | --- | 4 | 4.8 | 0 | --- | --- | --- |
| 13 | 5 | Triethylamine | 1 | 60 | 4.2 | 0 | 97.7 | 1.2 | 1.1 |
| 14 | 5 | do | 2.5 | 59 | 2.8 | 0 | 97.0 | 1.3 | 1.7 |
| 15 | 2.5 | --- | --- | 0 | --- | --- | --- | --- | --- |
| 16 | 2.5 | Triethylamine | 1.25 | 22 | 1.2 | 0 | 93.6 | 2.1 | 4.3 |
| 17 | 10 | --- | --- | 5 | 4.5 | 0 | --- | --- | --- |
| 18 | 10 | Dimethylaniline | 2 | 63 | 3.4 | 0 | 97.2 | 1.4 | 1.4 |
| 19 | 10 | do | 3 | 50 | 2.4 | 0 | 96.7 | 1.4 | 1.9 |
| 20 | 5 | --- | --- | 1 | --- | --- | --- | --- | --- |
| 21 | 5 | Dimethylaniline | 1 | 19 | 3.0 | 0 | --- | --- | --- |

[1] See Footnote 1 of Table II.
[2] See Footnote 3 of Table IX.

EXAMPLE XX

A series of runs was made to study the charge order for the polymerization of butadiene in the presence of an ethylaluminum dichloride-CoCl$_2$-pyridine catalyst system. The following recipe was employed:

Recipe

| | Parts by weight |
|---|---|
| 1,3-butadiene (Bd) | 100. |
| Toluene (T) | 1200. |
| Pyridine (Py) | 0.2 (2.5 mmoles). |
| Ethylaluminum dichloride (EADC) | 0.64 (5.0 mmoles). |
| Cobaltous chloride (CoCl$_2$) | 0.13 (1.0 mmoles). |
| Temperature, °F. | 86. |
| Time, hours | 16. |

The different charge orders and results obtained are shown in Table XXIV.

TABLE XXIV

| Run No. | Charge order | | | | | Conversion, percent |
|---|---|---|---|---|---|---|
| 1 | T | CoCl$_2$ | EADC | Bd | | 23 |
| 2 | T | CoCl$_2$ | Py | EADC | Bd | 95 |
| 3 | T | CoCl$_2$ | EADC | Py | Bd | 28 |
| 4 | T | EADC | Py | CoCl$_2$ | Bd | 9 |
| 5 | CoCl$_2$ | EADC | T | Bd | | 28 |
| 6 | CoCl$_2$ | EADC | Py | T | Bd | 0 |
| 7 | CoCl$_2$ | Py | EADC | T | Bd | 92 |
| 8 | EADC | Py | CoCl$_2$ | T | Bd | 26 |
| 9 | T | Bd | EADC | | | 0 |
| 10 | T | Bd | EADC | CoCl$_2$ | | 11 |
| 11 | T | Bd | EADC | CoCl$_2$ | Py | 16 |
| 12 | T | Bd | EADC | Py | CoCl$_2$ | Trace |
| 13 | T | CoCl$_2$ | Bd | EADC | | 11 |
| 14 | T | CoCl$_2$ | Bd | Py | EADC | 92 |

From the foregoing, it is seen that high conversions were obtained in the runs in which the amine-type compound and the cobalt compound were contacted prior to charging of the alkylaluminum halide. In the runs in which this charging procedure was not followed, the conversions were in comparison very low.

EXAMPLE XXI

Either cyclohexane or n-heptane was employed as the diluent in a series of runs for the polymerization of butadiene with an ethylaluminum dichloride-CoCl$_2$-pyridine catalyst system. The recipe was as follows:

Recipe

| | Parts by weight |
|---|---|
| 1,3-butadiene | 100. |
| Cyclohexane (C) or n-heptane (H) | 1200. |
| Pyridine (Py) | Variable. |
| Ethylaluminum dichloride (EADC) | Variable. |
| Cobaltous chloride | 0.13 (1.0 mmole). |
| Temperature, °F. | 41. |
| Time, hours | 16. |

The charging procedure was the same as that described in Example XIV.

All polymers were gel free. The quantities of materials charged and the results obtained are shown in Table XXV:

TABLE XXV

| Run No. | Solvent | EADC, mmoles | Pyridine, mmoles | Conv., percent | Inherent viscosity | Microstructure, percent | | |
|---|---|---|---|---|---|---|---|---|
| | | | | | | Cis | Trans | Vinyl |
| 1 | C | 10 | 0 | 0 | | | | |
| 2 | C | 10 | 2 | 65 | 1.01 | 96.3 | 2.0 | 1.7 |
| 3 | C | 10 | 5 | 39 | 0.84 | 93.7 | 2.6 | 3.7 |
| 4 | C | 5 | 0 | 0 | | | | |
| 5 | C | 5 | 1.5 | 51 | 0.80 | | | |
| 6 | C | 5 | 2 | 56 | 0.80 | 94.7 | 2.5 | 2.8 |
| 7 | C | 5 | 2.5 | 52 | 0.84 | 94.8 | 2.1 | 3.1 |
| 8 | H | 10 | 0 | | | | | |
| 9 | H | 10 | 2 | 38 | 0.69 | 95.8 | 2.1 | 2.1 |

These data show that when cyclohexane and n-heptane were used, the polymers had a lower inherent viscosity than the polymers obtained when using toluene. Conversions were also lower than in toluene runs.

EXAMPLE XXII

A series of runs was conducted in which isoprene was polymerized in accordance with the following recipe:

Recipe

| | Parts by weight |
|---|---|
| Isoprene | 100. |
| Toluene | 1200. |
| Pyridine (Py) | 0 or 0.4 (5 mmoles). |
| Ethylaluminum dichloride (EADC) | 1.27 (10 mmoles). |
| Cobaltous chloride (CoCl$_2$) | Variable. |
| Temperature, °F. | 86. |
| Time, hours | 64. |

The procedure described in Example XIV was also followed in these runs. The results of the several runs are shown below in Table XXVI:

TABLE XXVI

| Run No. | Pyridine, mmoles | CoCl$_2$, mmoles | Al/Co, mole ratio | Conv., percent | Inherent viscosity [3] |
|---|---|---|---|---|---|
| 1 | | 1 | 10/1 | [1]46 | |
| 2 | 5 | 1 | 10/1 | 25 | |
| 3 | | 2 | 5/1 | [1]43 | |
| 4 | 5 | 2 | 5/1 | 51 | |
| 5 | | 4.0 | 2.5/1 | [2]47 | 0.03 |
| 6 | 5 | 4.4 | 2.27/1 | 89 | 1.92 |

[1] Brittle resin.
[2] Low molecular weight resin.
[3] See Footnote 1 of Table II.

The products of Runs 1, 3 and 5, which were conducted in the absence of pyridine were brittle resins. When pyridine was included in the catalyst system, as in Runs 2, 4 and 6, the products obtained were rubbers. These data demonstrate that the presence of an amine-type compound in the catalyst system makes it possible to produce a product which is different from that obtained in its absence.

The product from Run 6 was examined by infrared analysis, and found to contain 36 percent of 3,4-addition product, the remainder being 1,4-addition product which was predominantly cis 1,4-addition. These determinations were made by measuring the intensities of the 8.90 micron and 11.25 micron bands recorded by a commercial infrared spectrometer. The cis and isopropenyl contents were calculated, the calculations being based on the aforementioned intensities compared with those of natural rubber. The natural rubber was assumed to contain 98 percent cis 1,4-addition and 2 percent 3,4-addition.

EXAMPLE XXIII

Two series of runs were made for the polymerization of butadiene at 14° F. using the recipe and procedure of Example XIV except that in one series of runs the solvent was cyclohexane. Details of the runs are given below in Table XXVII:

TABLE XXVII
TOLUENE SOLVENT

| Run No. | Pyridine, mmoles | Conv., percent | Inh. visc.[1] | Gel, percent[2] | Microstructure, percent | | |
|---|---|---|---|---|---|---|---|
| | | | | | Cis | Trans | Vinyl |
| 1 | 0 | 0 | | | | | |
| 2 | 2 | 40 | 4.03 | 0 | 98.5 | 0.7 | 0.8 |
| 3 | 3 | 56 | 3.57 | 0 | 98.2 | 0.9 | 0.9 |
| 4 | 4 | 73 | 2.74 | 0 | | | |
| 5 | 5 | 79 | 3.23 | 0 | 97.6 | 1.2 | 1.2 |
| 6 | 6 | 81 | 3.76 | 0 | | | |
| 7 | 7 | 54 | 2.09 | 0 | 97.2 | 1.0 | 1.8 |

CYCLOHEXANE SOLVENT

| | | | | | | | |
|---|---|---|---|---|---|---|---|
| 8 | 0 | 0 | | | | | |
| 9 | 2 | 24 | 1.93 | 0 | 98.4 | 0.7 | 0.9 |
| 10 | 3 | 54 | 1.60 | 0 | 98.0 | 0.9 | 1.1 |
| 11 | 4 | 77 | 1.40 | 0 | | | |
| 12 | 5 | 86 | 1.45 | 0 | 97.0 | 1.6 | 1.4 |
| 13 | 6 | 83 | 1.23 | 0 | | | |
| 14 | 7 | 59 | 0.84 | 0 | 95.2 | 2.0 | 2.8 |

[1] See Footnote 1 of Table II.
[2] See Footnote 3 of Table IX.

EXAMPLE XXIV

The rate of polymerization of butadiene at 41° F. in the presence of an ethylaluminum dichloride-cobaltous chloride catalyst containing pyridine was studied. The following recipe was used:

Recipe

| | Parts by weight |
|---|---|
| 1,3-butadiene | 100. |
| Toluene | 1200. |
| Pyridine | 0.20 (2.5 mmoles). |
| Ethylaluminum dichloride | 0.64 (5.0 mmoles). |
| Cobaltous chloride | 0.13 (1.0 mmole). |
| Temperature, ° F. | Variable. |
| Time, hours | 41. |

The results of this study are shown in Table XXVIII:

TABLE XXVIII

| Run No. | Time, hours | Conv., percent | Inherent viscosity[1] | Gel, percent[2] | Microstructure, percent | | |
|---|---|---|---|---|---|---|---|
| | | | | | Cis | Trans | Vinyl |
| 1 | 1.0 | 4 | 0.98 | 0 | | | |
| 2 | 2.0 | 16 | 1.21 | 0 | 95.3 | 1.6 | 3.1 |
| 3 | 3.0 | 26 | 1.26 | 0 | | | |
| 4 | 4.0 | 37 | 1.21 | 0 | 95.3 | 1.9 | 2.8 |
| 5 | 5.0 | 46 | 1.22 | 0 | | | |
| 6 | 6.0 | 54 | 1.23 | 0 | 95.4 | 1.8 | 2.8 |
| 7 | 7.0 | 60 | 1.26 | 0 | | | |
| 8 | 8.0 | 65 | 1.26 | 0 | 95.4 | 1.9 | 2.7 |
| 9 | 10.0 | 73 | 1.28 | 0 | | | |
| 10 | 12.0 | 79 | 1.27 | 0 | 95.5 | 1.9 | 2.6 |
| 11 | 23.0 | 92 | 1.29 | 0 | 95.7 | 2.0 | 2.3 |

[1] See Footnote 1 of Table II.
[2] See Footnote 3 of Table IX.

These data show that conversion was substantially constant at 8–9 percent per hour, decreasing from this value only after about 60 percent of the butadiene had been polymerized. The inherent viscosity remained constant after the earliest stages of the polymerization.

EXAMPLE XXV

Diethylamine was employed in conjunction with ethylaluminum dichloride and cobaltous chloride for the polymerization of butadiene. The recipe was as follows:

Recipe

| | Parts by weight |
|---|---|
| 1,3-butadiene | 100. |
| Toluene | 1200. |
| Diethylamine (Et$_2$NH) | Variable. |
| Ethylaluminum dichloride | Variable. |
| Cobaltous chloride | 0.13 (1.0 mmole). |
| Temperature, ° F. | 41. |
| Time, hours | 16. |

The charging procedure followed was the same as that described in Example XIV. The amounts of materials charged and results obtained are shown below in Table XXIX:

From the data in Table XXXI, it is seen that low conversions and high inherent viscosities were obtained in Runs 1 and 4 in which no pyridine was present in the catalyst system.

TABLE XXIX

| Run No. | EADC, mmoles | Et₂NH, mmoles | Amine/Al, mole ratio | Conv., percent | Inh. visc.[1] | Gel, percent[2] | Microstructure, percent | | |
|---|---|---|---|---|---|---|---|---|---|
| | | | | | | | Cis | Trans | Vinyl |
| 1 | 10 | 0 | | 3 | 4.49 | 0 | | | |
| 2 | 10 | 2 | 0.2/1 | 88 | 3.88 | 0 | 97.1 | 1.6 | 1.3 |
| 3 | 10 | 5 | 0.5/1 | 58 | 1.83 | 0 | 95.7 | 1.7 | 2.6 |
| 4 | 5 | 0 | | 0 | | | | | |
| 5 | 5 | 1 | 0.2/1 | 65 | 3.87 | 0 | 97.8 | 1.0 | 1.2 |
| 6 | 5 | 2 | 0.4/1 | 18 | 4.78 | 0 | 93.8 | 2.1 | 4.1 |

[1] See Footnote 1 of Table II.
[2] See Footnote 3 of Table IX.

EXAMPLE XXVI

Butadiene was polymerized in a series of runs using the recipe of Example XXV except that ammonia was used in place of diethylamine. The results of the runs are summarized in Table XXX.

TABLE XXX

| Run No. | EADC, mmoles | NH₃, mmoles | NH₃/Al, mole ratio | Conv., percent | Inh. visc.[1] | Gel, percent[2] | Microstructure, percent | | |
|---|---|---|---|---|---|---|---|---|---|
| | | | | | | | Cis | Trans | Vinyl |
| 1 | 10 | 0 | | 0 | | | | | |
| 2 | 10 | 0.5 | 0.05/1 | 84 | 7.08 | 42 | | | |
| 3 | 10 | 1.0 | 0.1/1 | 84 | 5.08 | 0 | 97.9 | 1.2 | 0.9 |
| 4 | 10 | 1.5 | 0.15/1 | 92 | 2.53 | 0 | 96.6 | 1.9 | 1.5 |
| 5 | 10 | 2.5 | 0.25/1 | 94 | 1.56 | 0 | 95.5 | 2.4 | 2.3 |
| 6 | 10 | 3.0 | 0.3/1 | 88 | 1.22 | 0 | 93.6 | 3.4 | 3.0 |
| 7 | 10 | 3.5 | 0.35/1 | 75 | 0.85 | 0 | 92.4 | 4.6 | 3.0 |
| 8 | 10 | 4.0 | 0.4/1 | 33 | 0.62 | 0 | | | |
| 9 | 5 | 0 | | 0 | | | | | |
| 10 | 5 | 0.5 | 0.1/1 | 82 | 2.96 | 0 | 97.2 | 1.5 | 1.3 |
| 11 | 5 | 1.0 | 0.2/1 | 75 | 1.41 | 0 | 95.3 | 2.3 | 2.4 |
| 12 | 5 | 1.5 | 0.3/1 | 16 | 0.98 | 0 | | | |

[1] See Footnote 1 of Table II.
[2] See Footnote 3 of Table IX.

EXAMPLE XXVII

A series of runs was made for the polymerization of butadiene using an ethylaluminum sesquichloride-cobaltous chloride-pyridine catalyst system. The following recipe was employed:

*Recipe* — Parts by weight
1,3-butadiene — 100.
Toluene — 1200.
Pyridine (Py.) — Variable.
Ethylaluminum sesquichloride (Et₃Al₂Cl₃) — Variable.
Cobaltous chloride — 0.13 (1.0 mmole).
Temperature, °F. — 41.
Time, hours — 16.

The charging procedure used was the same as that described in Example XIV. The results of the runs are summarized in Table XXXI.

EXAMPLE XXVIII

A series of runs was conducted in order to study the effect of catalyst level in the polymerization of butadiene. The following recipe was employed:

*Recipe* — Parts by weight
1,3-butadiene — 100.
Toluene — 1200.
Pyridine — Variable.
Ethylaluminum dichloride (EADC) — Variable.
Cobaltous chloride (CoCl₂) — Variable.
Mole ratio, Al/pyridine/Co — 5/2.5/1
Temperature, °F. — 41.
Time, hours — 16.

TABLE XXXI

| Run No. | Et₂Al₂Cl₃ mmoles | Pyridine mmoles | Conv., percent | Inh. Visc.[1] | Gel, percent[2] | Microstructure, percent | | |
|---|---|---|---|---|---|---|---|---|
| | | | | | | Cis | Trans | Vinyl |
| 1 | 10 | 0 | 39 | 13.8 | 0 | 98.6 | 0.7 | 0.7 |
| 2 | 10 | 2 | 100 | 2.76 | 0 | 96.9 | 1.7 | 1.4 |
| 3 | 10 | 5 | 100 | 1.93 | 0 | 95.6 | 2.3 | 2.1 |
| 4 | 5 | 0 | | | | | | |
| 5 | 5 | 1 | 10 | 7.42 | 0 | 98.2 | 1.0 | 0.8 |
| 6 | 5 | 1.5 | 98 | 2.46 | 0 | 97.1 | 1.5 | 1.4 |
| 7 | 5 | 2 | 98 | | | | | |
| 8 | 5 | 2.5 | 98 | | | | | |
| 9 | 5 | 3 | 99 | 1.82 | 0 | 95.5 | 2.4 | 2.1 |
| 10 | 5 | 3.5 | 98 | | | | | |
| 11 | 5 | 5 | 98 | 1.89 | 0 | 91.2 | 3.8 | 5.0 |

[1] See Footnote 1 of Table II.
[2] See Footnote 3 of Table IX.

The charging procedure used in Example XIV was also used in these runs. The results obtained in these runs are summarized in Table XXXII.

TABLE XXXII

| Run No. | EADC | | Pyridine | | CoCl₂ | | Conv., percent | Inh. visc.¹ | Gel, percent ² | ML-4 at 212° F |
|---|---|---|---|---|---|---|---|---|---|---|
| | Parts | Mmoles | Parts | Mmoles | Parts | Mmoles | | | | |
| 1 | 0.82 | 6.5 | 0.26 | 3.25 | 0.17 | 1.3 | 93 | 2.05 | 0 | 55 |
| 2 | 0.76 | 6.0 | 0.24 | 3.0 | 0.16 | 1.2 | 94 | 1.98 | 0 | 49 |
| 3 | 0.70 | 5.5 | 0.22 | 2.75 | 0.14 | 1.1 | 94 | 2.05 | 0 | 51 |
| 4 | 0.64 | 5.0 | 0.20 | 2.50 | 0.13 | 1.0 | 94 | 1.87 | 0 | 41 |
| 5 | 0.57 | 4.5 | 0.18 | 2.25 | 0.12 | 0.9 | 94 | 1.73 | 0 | 39 |
| 6 | 0.51 | 4.0 | 0.16 | 2.0 | 0.10 | 0.8 | 92 | 1.72 | 0 | 35 |

¹ See Footnote 1 of Table II.
² See Footnote 3 of Table IX.

As will be evident to those skilled in the art, many variations and modifications of this invention can be practiced in view of the foregoing disclosure. Such variations and modifications are believed to come within the spirit and scope of the invention.

I claim:

1. A process for polymerizing a monomeric material comprising a conjugated diene containing from 4 to 8, inclusive, carbon atoms per molecule which comprises contacting said monomeric material with a catalyst formed by mixing (1) a compound having the formula $RAlX_2$, wherein R is an alkyl radical and X is a halogen, and (2) the reaction product obtained by reacting a cobaltous compound with an amine-type compound selected from the group consisting of ammonia, pyridine, piperidine, and alkyl secondary and tertiary amines, the mole ratio of said $RAlX_2$ compound to said cobaltous compound being in the range of 2:1 to 400:1 and the mole ratio of said amine-type compound to said cobaltous compound being in the range of 0.5:1 to 8:1, provided that the mole ratio of amine-type compound to alkylaluminum dihalide does not exceed 0.6 when the level of the alkylaluminum dihalide which is used is below 10 millimoles per 100 parts of conjugated diene, said contacting occurring in the presence of a hydrocarbon diluent, at a temperature in the range of −100 to 250° F. and under pressure sufficient to maintain the reaction mixture in the liquid phase; and recovering the rubbery polymer so produced.

2. The process according to claim 1 in which said catalyst is formed by mixing ethylaluminum dichloride and the reaction product of cobaltous chloride and pyridine.

3. The process according to claim 1 in which said catalyst is formed by mixing ethylaluminum dichloride and the reaction product of cobaltous chloride and diethylamine.

4. The process according to claim 1 in which said catalyst is formed by mixing ethylaluminum dichloride and the reaction product of cobaltous acetate and pyridine.

5. The process according to claim 1 in which said catalyst is formed by mixing ethylaluminum dichloride and the reaction product of cobaltous chloride and ammonia.

6. A process for preparing a rubbery polybutadiene containing a high percentage of cis 1,4-addition which comprises contacting 1,3-butadiene with a catalyst formed by mixing (1) an organoaluminum compound having the formula $RAlX_2$, wherein R is an alkyl radical and X is a halogen, and (2) the reaction product of a cobaltous compound with an amine-type compound selected from the group consisting of ammonia, pyridine, piperidine, and alkyl secondary and tertiary amines, the mol ratio of said organoaluminum compound to said cobaltous compound being in the range of 2:1 to 400:1 and said cobaltous compound and said amine-type compound being reacted in substantially stoichiometric amounts, provided that the mole ratio of amine-type compound to alkylaluminum dihalide does not exceed 0.6 when the level of the alkylaluminum dihalide which is used is below 10 millimoles per 100 parts of 1,3-butadiene, said contacting occurring in the presence of a hydrocarbon diluent at a temperature in the range of −30 to 120° F. and under pressure sufficient to maintain the reaction mixture in the liquid phase; and recovering the rubbery cis-polybutadiene so produced.

7. The process of claim 6 wherein said reaction product is dipyridinocobaltous chloride.

8. A process for preparing a rubbery polybutadiene containing a high percentage of cis-1,4 addition which comprises contacting 1,3-butadiene with a catalyst formed by mixing (1) an organoaluminum compound having the formula $RAlX_2$, wherein R is an alkyl radical and X is a halogen, and (2) dipyridinocobaltous chloride, the mole ratio of said organoaluminum compound to said dipyridinocobaltous chloride being in the range of 2:1 to 10:1, provided that the mole ratio of pyridine in the dipyridinocobaltous chloride to said organoaluminum compound does not exceed 0.6 when the level of said organoaluminum compound is below 10 millimoles per 100 parts of 1,3-butadiene, said contacting occurring in the presence of a hydrocarbon diluent at a temperature in the range of −30 to 120° F. and at a pressure sufficient to maintain the reaction mixture in the liquid phase and recovering the rubbery cis-polybutadiene so produced.

9. A process for preparing a rubbery polybutadiene containing a high percentage of cis-1,4 addition which comprises contacting 1,3-butadiene with a catalyst formed by mixing (1) an organoaluminum compound having the formula $RAlX_2$, wherein R is an alkyl radical and X is a halogen, and (2) the reaction product of a cobaltous compound selected from the group consisting of cobaltous halides and cobaltous salts of organic acids with an amine-type compound selected from the group consisting of ammonia, pyridine, piperidine, and alkyl secondary and tertiary amines, the mole ratio of said organoaluminum compound to said cobaltous compound being in the range of 2:1 to 400:1 and the mole ratio of said amine-type compound to said cobaltous-type compound being in the range of 0.5:1 to 8:1, provided that the mole ratio of amine-type compound to alkylaluminum diahalide does not exceed 0.6 when the level of the alkylaluminum dihalide which is used is below 10 millimoles per 100 parts of 1,3-butadiene, said contacting occurring in the presence of a hydrocarbon diluent at a temperature in the range of −30 to 120° F. and under pressure sufficient to maintain the reaction mixture in the liquid phase, and recovering the rubbery polymer so produced.

References Cited by the Examiner

UNITED STATES PATENTS 3,084,148  4/63  Youngman _____ 260—94.3

FOREIGN PATENTS 543,292   6/56  Belgium.
1,241,011 8/60  France.
789,781   1/58  Great Britain.
587,968   1/59  Italy.
916,000         Great Britain equivalent.
594,618   6/59  Italy.

JOSEPH L. SCHOFER, *Primary Examiner.*

LESLIE H. GASTON, WILLIAM H. SHORT,
*Examiners.*